US011913703B2

(12) United States Patent
Givens

(10) Patent No.: US 11,913,703 B2
(45) Date of Patent: Feb. 27, 2024

(54) ENHANCED HEAT TRANSFER IN LIQUEFIED GAS COOLED DETECTOR

(71) Applicant: Onto Innovation Inc., Wilmington, MA (US)

(72) Inventor: James Givens, Bend, OR (US)

(73) Assignee: Onto Innovation Inc., Wilmington, MA (US)

( * ) Notice: Subject to any disclaimer, the term of this patent is extended or adjusted under 35 U.S.C. 154(b) by 376 days.

(21) Appl. No.: 16/839,784

(22) Filed: Apr. 3, 2020

(65) Prior Publication Data

US 2021/0310720 A1 Oct. 7, 2021

(51) Int. Cl.
*F25D 19/00* (2006.01)
*F25B 19/00* (2006.01)
*F17C 3/08* (2006.01)

(52) U.S. Cl.
CPC .............. *F25D 19/006* (2013.01); *F17C 3/08* (2013.01); *F25B 19/005* (2013.01)

(58) Field of Classification Search
CPC ........... F25D 19/06; F17C 3/08; F25B 19/005
See application file for complete search history.

(56) References Cited

U.S. PATENT DOCUMENTS 3,188,830 A * 6/1965 Cowans .................. F17C 3/085 165/185
3,483,709 A * 12/1969 Sayres .................. F25B 19/005 62/51.1
3,851,173 A 11/1974 Taylor et al.
4,324,104 A * 4/1982 Horn ..................... F25D 19/006 62/51.1
4,873,843 A * 10/1989 Volten ................... F25D 19/006 62/51.1
5,187,939 A * 2/1993 Skertic .................. F25D 19/006 250/352
5,302,831 A 4/1994 Gallagher et al.
6,122,919 A 9/2000 Patel et al.
9,010,202 B2 4/2015 Stabacinskiene et al.

FOREIGN PATENT DOCUMENTS

CN 201532076 7/2010
EP 1533582 5/2015

OTHER PUBLICATIONS

Muneo Kida , Yoshihiro Kikuchci , Osamu Takahashi & Itaru Michiyoshi (1981) Pool-Boiling Heat Transfer in Liquid Nitrogen, Journal of Nuclear Science and Technology, 18:7, 501-513, DOI: 10.1080/18811248.1981.9733284.

* cited by examiner

*Primary Examiner* — Tavia Sullens
(74) *Attorney, Agent, or Firm* — Paradice & Li LLP

(57) ABSTRACT

A horizontal Dewar flask is used with an optical metrology device, which may advantageously reduce the vertical height of the device. A thermal transfer member provides thermal transfer between a liquefied gas cooled sensor and liquefied gas in a chamber of the Dewar flask. To compensate for the loss of thermal transfer from the sensor as the liquefied gas evaporates and changes to a gaseous state, the thermal transfer member biases heat transfer to the liquefied gas that is at the bottom of the chamber. The thermal transfer member may have a larger surface area at a bottom portion of the thermal transfer member than the upper portion. For example, the thermal transfer member may include one or more projections that extend into the liquefied gas with greater density at the bottom of the chamber than at the top of the chamber.

19 Claims, 7 Drawing Sheets

ENHANCED HEAT TRANSFER IN LIQUEFIED GAS COOLED DETECTOR

FIELD OF THE INVENTION

The present invention is related to liquefied gas cooled detectors, and in particular to providing effective heat transfer to liquefied gas cooled detectors.

BACKGROUND

Semiconductor and other similar industries often use optical metrology equipment to provide non-contact evaluation of substrates during processing. Detectors, sometimes referred to as sensors, are used to convert received radiation energy into electrical signals that can be analyzed. Some types of metrology devices require a significant amount of cooling of the sensors to reach a suitable operating temperature. For example, infrared sensors, and other similar types of sensors, such as X-ray radiation sensors, require cooling to cryogenic temperatures in order to efficiently and reliably operate. Liquefied gas, such as liquefied nitrogen, is often used to cool such sensors to the desired operating temperatures.

During operation, effective and consistent heat transfer from the sensors is desired. Changes in the temperature at the sensor will alter the performance of the sensor, which will negatively affect measurement stability of the metrology device.

SUMMARY

A horizontal Dewar flask is used with an optical metrology device, which may advantageously reduce the vertical height of the device. A thermal transfer member provides thermal transfer between a liquefied gas cooled sensor and liquefied gas in a chamber of the Dewar flask. To compensate for the loss of thermal transfer from the sensor as the liquefied gas evaporates and changes to a gaseous state, the thermal transfer member biases heat transfer to the liquefied gas that is at the bottom of the chamber as opposed to gas in a gaseous state at the top of the chamber. The thermal transfer member may have a larger surface area at a bottom portion of the thermal transfer member than the upper portion. For example, the thermal transfer member may include one or more projections that extend into the liquefied gas with greater density at the bottom of the chamber than at the top of the chamber.

In one implementation, an apparatus for transferring heat from a liquefied gas cooled detector includes a horizontal Dewar flask positioned with a length extending in a horizontal direction, the horizontal Dewar flask having an internal chamber for holding liquefied gas and having a top and a bottom; and a thermal transfer member mounted to an end of the horizontal Dewar flask, the thermal transfer member having a thermal transfer surface and a second surface that is opposite the thermal transfer surface and that has at least one projection that extends into the internal chamber of the horizontal Dewar flask at the bottom of the internal chamber; wherein the thermal transfer surface of the thermal transfer member is configured to have the liquefied gas cooled detector mounted thereon.

In one implementation, an apparatus for transferring heat in a liquefied gas cooled detector includes a horizontal Dewar flask positioned with a length extending in a horizontal direction, the horizontal Dewar flask having an internal chamber for holding liquefied gas and having a top and a bottom; and a thermal transfer member mounted to an end the horizontal Dewar flask, the thermal transfer member having a first surface and a second surface that is opposite the first surface and that is in contact with the liquefied gas held in the internal chamber, the second surface having a larger surface area at a bottom portion of the second surface than at an upper portion of the second surface, wherein the liquefied gas cooled detector is thermally coupled to the first surface.

In one implementation, an apparatus for transferring heat in a liquefied gas cooled detector includes a horizontal Dewar flask positioned with a length extending in a horizontal direction, the horizontal Dewar flask having an internal chamber for holding liquefied gas and having a top and a bottom; a thermal transfer member mounted to an end of the horizontal Dewar flask, the thermal transfer member having a first surface and a second surface that is opposite the first surface and that is in contact with the liquefied gas held in the internal chamber, the second surface having a means for biasing thermal transfer to liquified gas at the bottom of the internal chamber; and a means for thermal transfer from the liquefied gas cooled detector to the thermal transfer member.

DESCRIPTION

Liquefied gas cooled detector, such as infrared sensor or X-ray detectors, used in optical metrology devices require a large amount of thermal transfer to operate efficiently. Dewar flasks are insulating storage vessels that are used to hold a liquefied gas, such as liquefied nitrogen. Sensors may be mounted to thermal transfer members in the Dewar flasks to provide the necessary thermal transfer. While Dewar flasks may hold gas in a liquefied state for an extended period of time, the liquefied gas will eventually evaporate by changing into a gaseous state, which is not cold enough to provide the desired thermal transfer to liquefied gas cooled sensors. Accordingly, periodic replenishment of the liquefied gas is required. To minimize disruption to metrology operations, it is desirable to replenish the liquefied gas infrequently.

Figure 1:
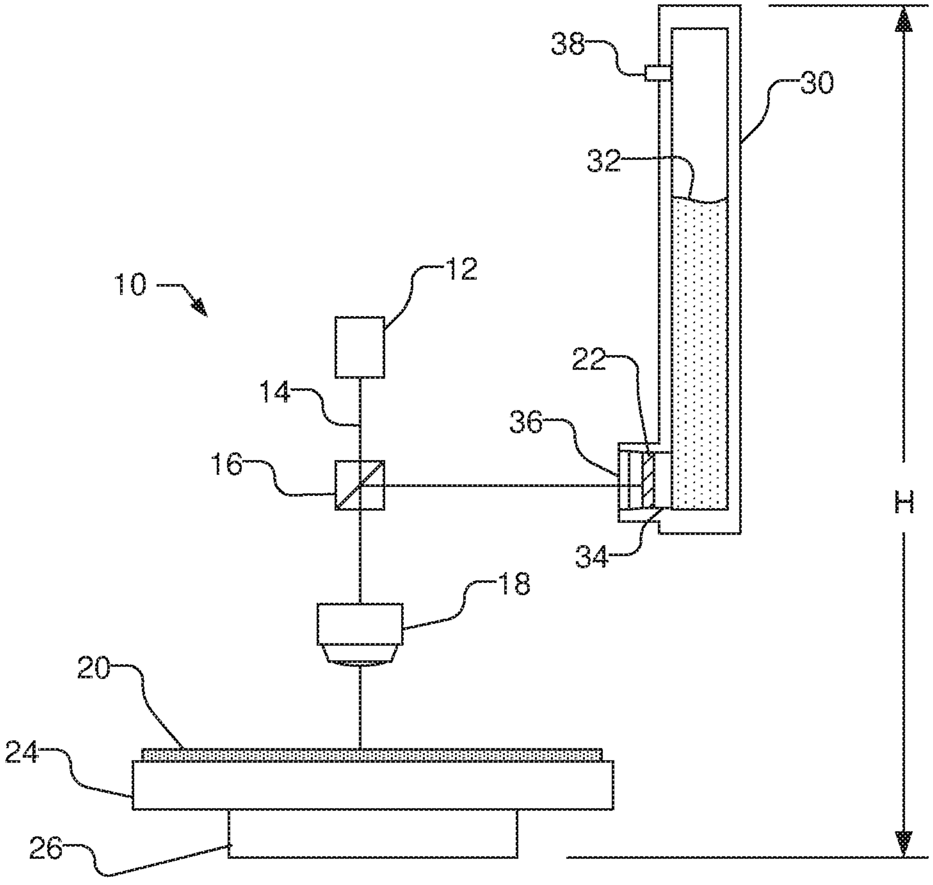
FIG. 1 illustrates an optical metrology device that uses a liquefied gas cooled sensor and a vertical Dewar flask that contains a liquefied gas.

FIG. 1 illustrates an optical metrology device 10 that uses a liquefied gas cooled sensor. Metrology device 10 is illustrated as a normal incidence reflectometer in which a light source 12 produces infrared radiation 14 that passes through a beam splitter 16 and is focused on a sample 20 by an objective lens 18. The sample 20 for example may be held on a chuck 24 and stage 26 to place the sample 20 in a desired orientation with respect to the objective lens 18. The light returning from the sample 20 is received by the objective lens 18 and is directed to a sensor 22 by the beam splitter 16. The sensor 22 is coupled to a Dewar flask 30, which is filled with a liquefied gas 32, e.g., liquefied nitrogen. The sensor 22 is thermally coupled to a thermal transfer member 34, sometimes referred to as a cold finger, that provides the thermal transfer between the sensor 22 and the liquefied gas 32. The Dewar flask 30 may include a window 36 or port through which the light enters the Dewar flask 30 to be incident on the sensor 22. The Dewar flask 30 may further include a refill port 38 to refill the liquefied gas 32 as the liquefied gas 32 evaporates.

Commercially available Dewar flask assemblies are typically vertical with the sensor positioned near the bottom of the Dewar flask, e.g., as illustrated in FIG. 1. With the sensor near the bottom of the Dewar flask, gravity keeps the thermal transfer member 34 submerged in the liquefied gas 32 until the Dewar flask 30 is almost empty. Thus, the sensor 22 will remain in good thermal contact with the liquefied gas 32 until the liquefied gas 32 is nearly depleted. As further illustrated in FIG. 1, however, because the Dewar flask 30 is held in a vertical orientation, the height H for the metrology device 10 between the bottom of the stage 26 and the top of the Dewar flask 30 is relatively large. For example, in FIG. 1, the Dewar flask 30 is illustrated as extending well above metrology device.

Figure 2:
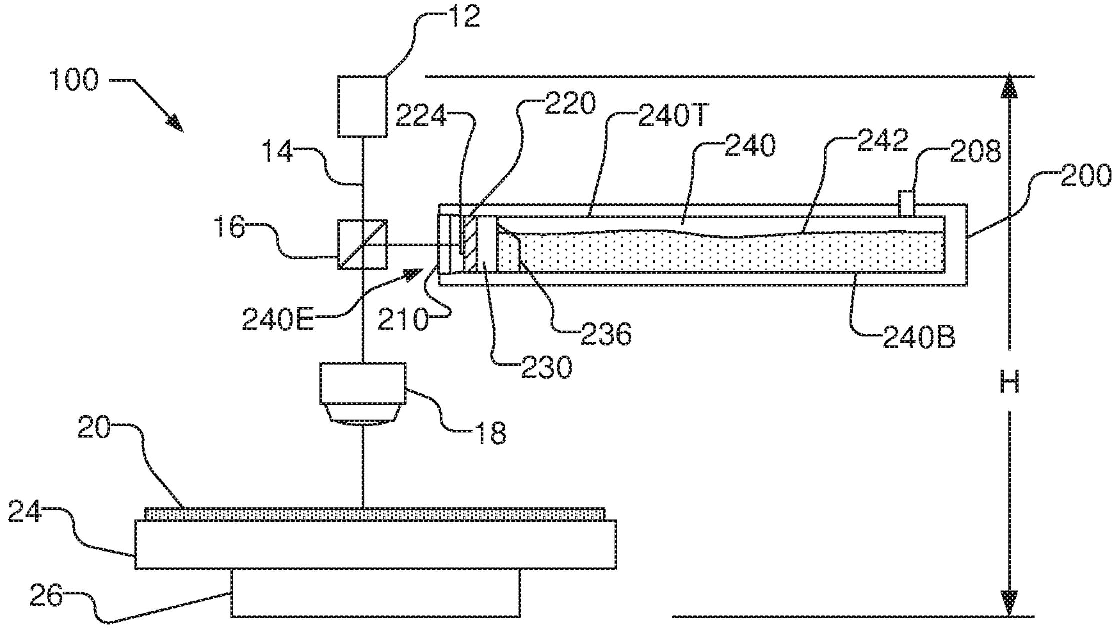
FIG. 2 illustrates an optical metrology device that uses a liquefied gas cooled sensor and a horizontal Dewar flask that contains liquefied gas and a thermal transfer member that biases thermal transfer from the sensor to the bottom portion of the thermal transfer member.

FIG. 2 illustrates a metrology device 100, which is similar to metrology device 10 shown in FIG. 1, like designated elements being the same, but with a Dewar flask 200 that is configured to be positioned horizontally in order to greatly reduce the height H, as the Dewar flask 200 does not extend above the metrology device. It should be understood that the metrology device 100 is illustrated for exemplary purposes and that a horizontally oriented Dewar flask 200 may be used with other types of metrology devices.

As illustrated in FIG. 2, the Dewar flask 200 is oriented horizontally, e.g., Dewar flask 200 has a length that extends in a horizontal direction. An internal chamber 240 of the Dewar flask 200 holds a liquefied gas 242, such as liquefied nitrogen. When in the horizontal orientation, the internal chamber 240 has a top 240T and a bottom 240B, wherein gas in the liquid state is held at the bottom 240B of the chamber 240 and gas in the gaseous state is at the top 240T of the chamber 240 due to gravity. The internal chamber 240 further includes an end 240E, at which a thermal transfer member 230 is positioned. The detector 224, which may be, e.g., an MCT (Mercury-Cadmium-Telluride) IR (infrared) detector and is sometimes referred to herein as a sensor) may be thermally mounted to the thermal transfer member 230. For example, the detector 224 may be part of a sensor assembly 220 that includes one or more of the detector 224, a circuit board (not shown), and a sensor mount (e.g., sensor mount 320 shown in FIG. 3). The thermal transfer member 230 is configured to have the sensor assembly 224 mounted thereon so that the sensor assembly 224 is in thermal contact with the thermal transfer member 230 and the thermal transfer member 230 is in physical contact with the liquefied gas 242 to provide thermal transfer between the detector 224 and the liquefied gas 242. The Dewar flask 200 may further include a window 210, or port, that faces the sensor assembly 220 and through which light passes and to be incident on the detector 224. The Dewar flask 200 may further include a refill port 208 to refill the liquefied gas 242 as the liquefied gas 242 evaporates.

While the Dewar flask 200 enables a lower height H for the metrology device 100 due to its horizontal orientation, as illustrated in FIG. 2, even a small amount of evaporation of the liquefied gas 242 results in a headspace between the liquefied gas 242 and the top 240T of the internal chamber 240, resulting in less than full contact between the thermal transfer member 230 and the liquefied gas 242. As the liquefied level in the Dewar flask 200 drops, the headspace increases and the detector 224 gradually transitions from full contact with the liquefied gas 242 to little or no contact with liquefied gas 242, i.e., the detector 224 will be in thermal contact only with the gas in a warmer gaseous state. Thus, the heat transfer regime transitions from nucleate boiling of the liquefied gas 242 to conduction and natural convection. The convection coefficient significantly decreases, e.g., dropping at least two orders of magnitude, during this heat transfer transition, which, unless compensated, will produce a significant change in the detector temperature, negatively affecting measurement stability.

Heat at the detector 224, e.g., produced by infrared light received by the detector and ambient temperature is transferred to the thermal transfer member 230, which transfers heat to the liquified gas in the chamber 240. A means for thermal transfer from the detector 224 to the thermal transfer member 240 may include, e.g., any intervening components between the detector 224 itself and the thermal transfer member 240, such as the sensor assembly 220 if present, which may include a circuit board and sensor mount, the surface of the thermal transfer member 240 on which the detector 224/sensor assembly 220 is mounted, e.g., which may be configured for efficient heat transfer, and any thermal transfer adhesive, tape, paste, grease, etc. used to improve heat transfer.

The surface of the thermal transfer member 230 that is in contact with the liquefied gas 242 includes a means for biasing thermal transfer to liquified gas, which is at the bottom 240B of the chamber 240, as opposed to gas in the gaseous state in the headspace at the top 240T of the chamber 240. For example, the means for biasing thermal transfer may include a larger surface area at a bottom portion of the second surface that is in contact with the liquified gas than at an upper portion of the second surface that is in contact with the gas in a gaseous state in the headspace, which may assist in compensating for loss of thermal transfer from the detector as the liquefied gas evaporates. For example, as illustrated in FIG. 2, the means for biasing thermal transfer may include at least one projection 236 that extends into the liquefied gas 242 to increase the surface area of the thermal transfer member 230 at the bottom portion of the thermal transfer member 230. The projection 236, for example, may be a plurality of vertically oriented fins at the bottom portion of the thermal transfer member 230 and may include greater surface area at the bottom 240B of the chamber 240 than the top 240T of the chamber 240. Additionally or alternatively, the projection may be one or more ridges, corrugations, pins, or cones or may include cylindrical or partially cylindrical projections that may or may not include radially extending fins. The means for biasing thermal transfer may include projections on the thermal transfer member 230 that have a greater density or extend farther into the chamber 240 at the bottom 240B of the chamber 240 than at the top 240T of the chamber to increase the thermal contact area with the liquified gas 242. The increase in thermal contact area with the liquefied gas 242 increases the thermal transfer between the detector 224 and the liquefied gas 242 as the liquefied gas 242 evaporates thereby reducing the deleterious effects on measurement stability.

Figure 3:
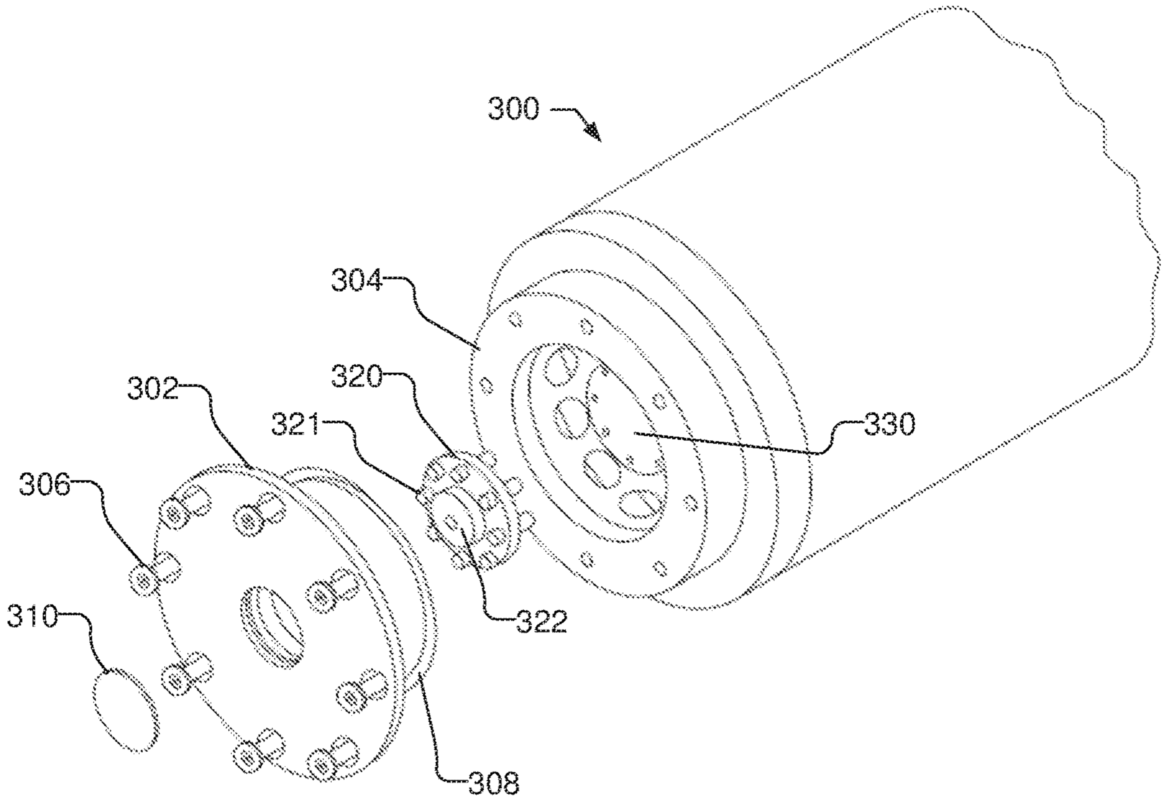
FIG. 3 illustrates a blown-up perspective view of an end portion of a horizontal Dewar flask.

FIG. 3 illustrates a blown-up perspective view of an end portion of a horizontal Dewar flask 300, which may be similar to the Dewar flask 200 shown in FIG. 2. The end of Dewar flask 300 may include a window mount 302 that is mounted to the Dewar flask body 304 with a plurality of screws 306 or other appropriate attachment mechanism, e.g., clamps, clasps or adhesives. A gasket 308 may be used to provide a seal between the window mount 302 and the Dewar flask body 304. A window 310 may be mounted in the window mount 302. The window 310 is formed from a material that is transparent to the radiation used by the metrology device, e.g., infrared radiation, such as sapphire, silicon, or any other appropriate material. The use of a window and window mount may be obviated if a sensor on the sensor mount 320 can be otherwise sealed or protected, e.g., if the Dewar flask body 304 is mounted to the optical metrology device 100.

A sensor mount 320 mounts to a thermal transfer member 330, shown positioned within and sealing the internal chamber of the Dewar flask 300. The sensor mount 320, for example, may be mounted to the thermal transfer member 330 using a plurality of screws 321 or other appropriate attachment mechanism, e.g., clamps, clasps or adhesives. If desired, a thermal transfer grease or cryogenic grease may be disposed between the sensor mount 320 and the thermal transfer member 330. The sensor mount 320 includes a sensor platform 322 upon which a liquefied gas cooled detector is mounted, e.g., mechanically or with an adhesive. The sensor, for example, may include an MCT detector and board. If desired, the sensor may be mounted directly to the thermal transfer member 330 thereby obviating the need for a separate sensor mount 320, in which case the thermal transfer member 330 serves as the sensor mount. The sensor mount 320 and/or the sensor may include any necessary leads or electrodes with which radiation detection signals may be provided off-chip for analysis by the metrology device as used in conventional systems.

Figure 4:
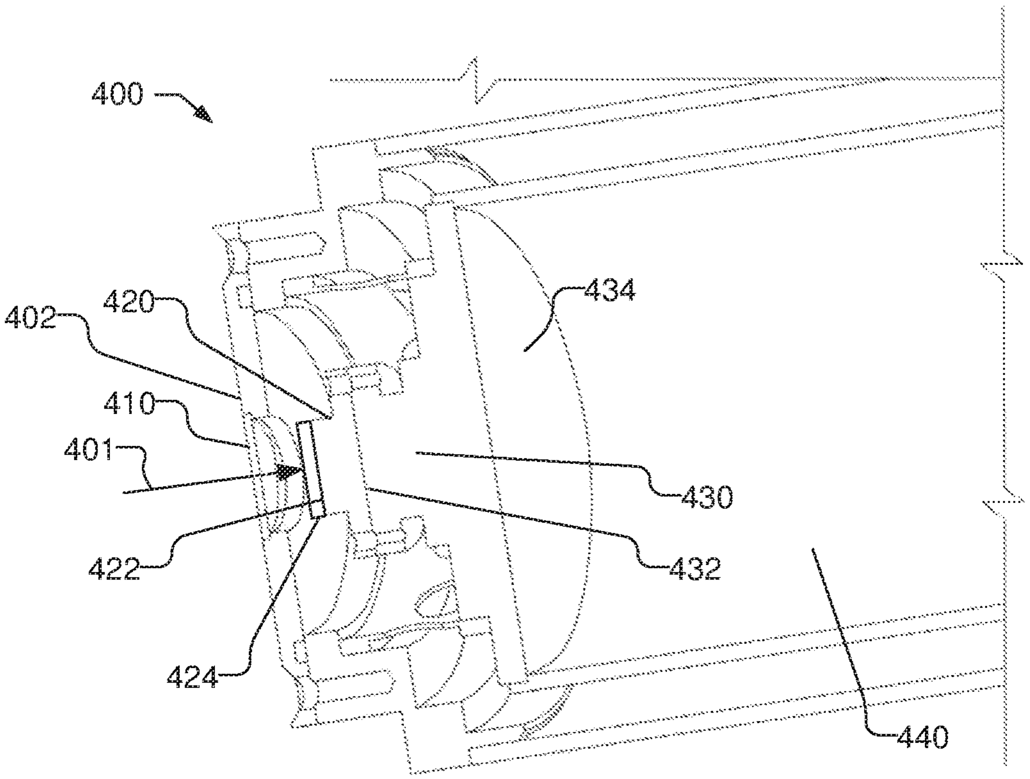
FIG. 4 illustrates a cut-away perspective view of an end portion of a horizontal Dewar flask with a thermal transfer member that does not bias thermal transfer from the sensor to the bottom portion of the thermal transfer member.

FIG. 4 illustrates a cut-away perspective view of the end portion of a horizontal Dewar flask 400, which may be similar to the horizontal Dewar flask 300 shown in FIG. 3 and the horizontal Dewar flask 200 shown in FIG. 2. FIG. 4 illustrates radiation 401 passing through a window 410 held in a window mount 402 and incident on a sensor 424 that is mounted on a sensor platform 422 of a sensor mount 420. The sensor mount 420 is mounted to a thermal transfer member 430 that seals the internal chamber 440 of the Dewar flask 400. The thermal transfer member includes two opposite thermal transfer surfaces, a first surface 432 upon which the sensor mount 420 (or the sensor 424) is mounted and a second surface 434 that is in the internal chamber 440 and is in physical contact with liquefied gas in the internal chamber 440. In the Dewar flask 400 illustrated in FIG. 4, the second surface 434 of the thermal transfer member 430 is planar. Thus, unlike the thermal transfer member 230 shown in FIG. 2, the thermal transfer member 430 does not include any projections or other mechanisms to help compensate for the effects of the heat transfer transition as liquefied gas within the internal chamber 440 evaporates from a liquefied to a gas.

Figure 5:
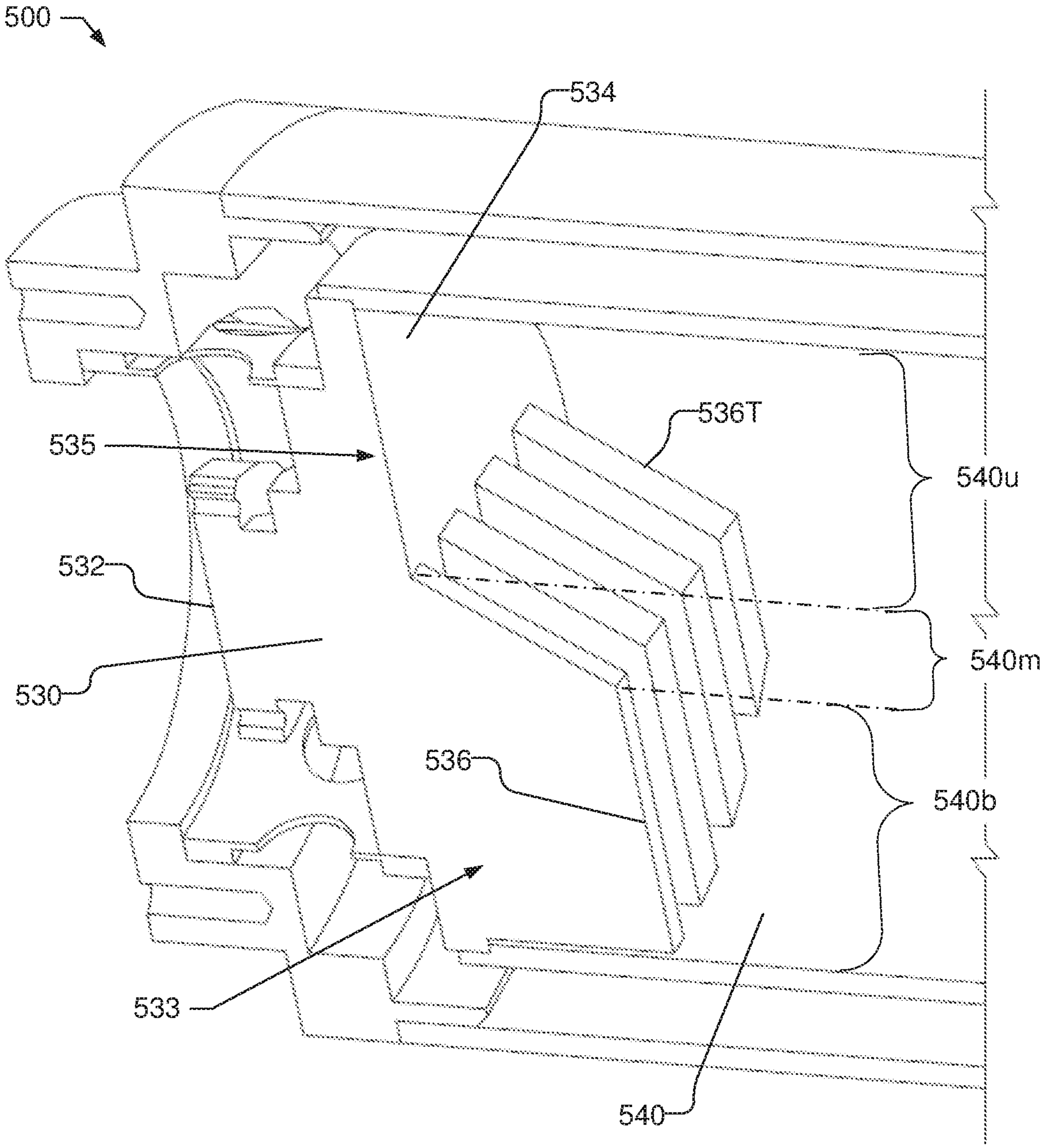
FIG. 5 illustrates a cut-away perspective view of an end portion of a horizontal Dewar flask with a thermal transfer member that includes a plurality of fins to bias thermal transfer from the sensor to the bottom portion of the thermal transfer member.

FIG. 5 illustrates a cut-away perspective view of the end portion of a horizontal Dewar flask 500, which may be similar to the horizontal Dewar flask 300 shown in FIG. 3 and the horizontal Dewar flask 200 shown in FIG. 2. FIG. 5 does not show a window or sensor mount, but may include a window 402 with window 410 and sensor mount 420 with sensor 424 as shown in FIG. 4. If desired, a sensor, e.g., sensor 424 shown in FIG. 4, may be mounted directly to the thermal transfer member 530 obviating the need for sensor mount 420.

The thermal transfer member 530 includes a first surface 532 upon which a sensor assembly, such as a sensor mount and/or sensor, may be mounted. A second surface 534 of the thermal transfer member 530 is exposed to the internal chamber 540 and thus the liquefied gas in internal chamber 540. The second surface 534 has a larger surface area at a bottom portion of the second surface 534, shown generally by arrow 533 than at an upper portion of the second surface 534, shown generally by arrow 535, which biases the thermal transfer from the sensor to liquefied gas at the bottom portion 533 of the second surface 534, as opposed to the upper portion 535, which is exposed to gas in a gaseous state in the headspace after the liquefied gas begins to evaporate. By biasing the thermal transfer to the bottom portion 533 of the second surface 534, the thermal transfer member 530 at least partially compensates for the loss of thermal transfer as the liquefied gas evaporates. By way of example, the thermal transfer member 530 may include at least one projection that extends into the internal chamber 540 to increase the surface area of the thermal transfer member 530 at the bottom portion 533 of the surface 534. The at least one projection may be one or more ridges, corrugations, pins, or cones or may include cylindrical or partially cylindrical projections that may or may not include radially extending fins.

The thermal transfer member 530 may be formed from a thermally conductive material, such as aluminum, zinc or a nickel-iron alloy, or other suitable material. The at least one least one projection of the second surface 534 may be integrally formed from the thermal transfer member 530.

As illustrated in FIG. 5, the at least one projection of the second surface 534 is a plurality of projections in the form of a plurality of vertically oriented fins 536. As illustrated, the fins 536 are located at the bottom portion 533 of the surface 534 and are not present on the upper portion 535 of the surface 534. Accordingly, the fins 536 do not extend into an upper volume 540*u* of the internal chamber 540. The fins 536 extend into a middle volume 540*m* and a bottom volume 540*b* of the internal chamber 540. If desired, the tops 536T of the fins 536 may be tapered in the middle volume 540*m* of the internal chamber 540.

Thus, during operation, the internal chamber 540 may be filled with liquefied gas, e.g., liquefied nitrogen, up to or near the top of internal chamber 540. Over time, the liquefied gas evaporates and changes from a liquefied state to a gaseous state, and the volume of liquefied gas decreases until it reaches the middle volume 540*m* of the internal chamber 540. Up to this time, the amount of liquefied gas in contact with the surface 534 of the thermal transfer member 530 has been adequate to provide a desired amount of cooling of a sensor in thermal contact with the thermal transfer member 530. As the volume of liquefied gas continues to decrease and the headspace increases, the heat transfer regime transitions from nucleate boiling to conduction and natural convection and the temperature of the sensor will begin to increase. The increased surface area of the fins 536 in contact with the liquefied gas, however, will help compensate for the upper portion 535 of the second surface 534 not being in contact with liquefied gas. It may be desirable to bevel the tops 536T of the fins 536 that are present in the middle volume 540*m* of the internal chamber 540 so that the surface area of the fins that is exposed to a gaseous state is minimized to minimize the thermal transfer due to gas in a warmer gaseous state while maximizing the thermal transfer due to cooler liquefied gas.

Figure 6A:
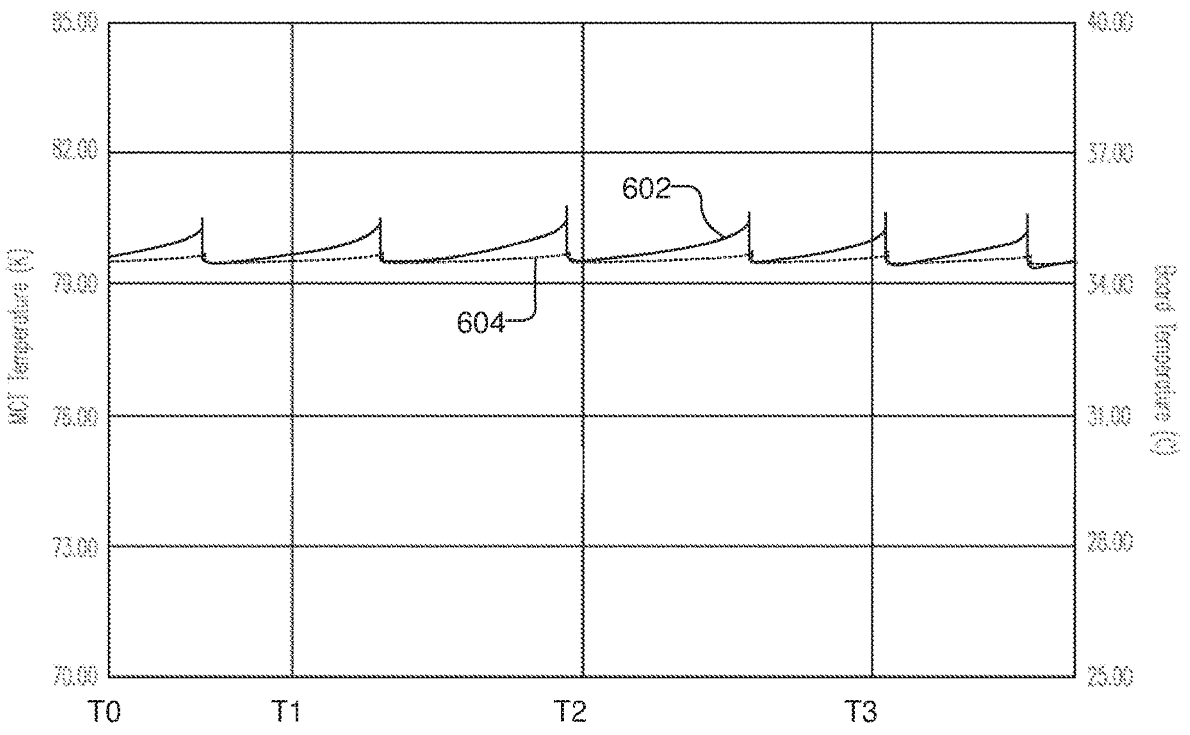
FIG. 6A is a graph illustrating the temperature profile of sensors mounted to thermal transfer members in a horizontal Dewar flask over time.

FIG. 6A is a graph illustrating the temperature profile of sensors mounted to thermal transfer members in a horizontal Dewar flask over time, e.g., multiple days. Curve 602 represents the temperature profile of a sensor that is thermally coupled to a thermal transfer member that does not include any projections or other compensation for effects of the heat transfer transition as the liquefied gas 242 transitions from a liquefied state to a gaseous state, e.g., such as thermal transfer member 430 shown in FIG. 4. Curve 604 is an example of a temperature profile of a sensor that is coupled to a thermal transfer member that includes projections, such as with thermal transfer member 530 having fins 536 shown in FIG. 5 to compensate for the effects of the heat transfer transition as the liquefied gas transitions from a liquefied state to a gaseous state. Curve 606 represents the temperature profile of the board upon which the sensor is mounted when the thermal transfer member does not include any projections or other compensation for effects of the heat transfer transition as the liquefied gas 242 evaporates from a liquefied to a gas. As can be seen by curves 602 and 604, the temperature of the sensor in a horizontal Dewar flask will increase over time due to evaporation of the liquefied gas until it is replenished in the Dewar flask, typically in about a 10-12 hour period. It has been found that temperature excursions of approximately 0.8° C. or more over a 10-12 hour period may be typical when the thermal transfer member does not compensate for the effects of the heat transfer transition. For best metrology results, however, temperature excursions of 0.25° C. or less over a 10-12 hour period are desirable. As illustrated by curve 604, a suitably small temperature excursion in temperature profile may be achieved using a thermal transfer member that biases the thermal transfer from the sensor to liquefied gas at the bottom portion of the thermal transfer member, as illustrated in FIG. 5.

Figure 6B:
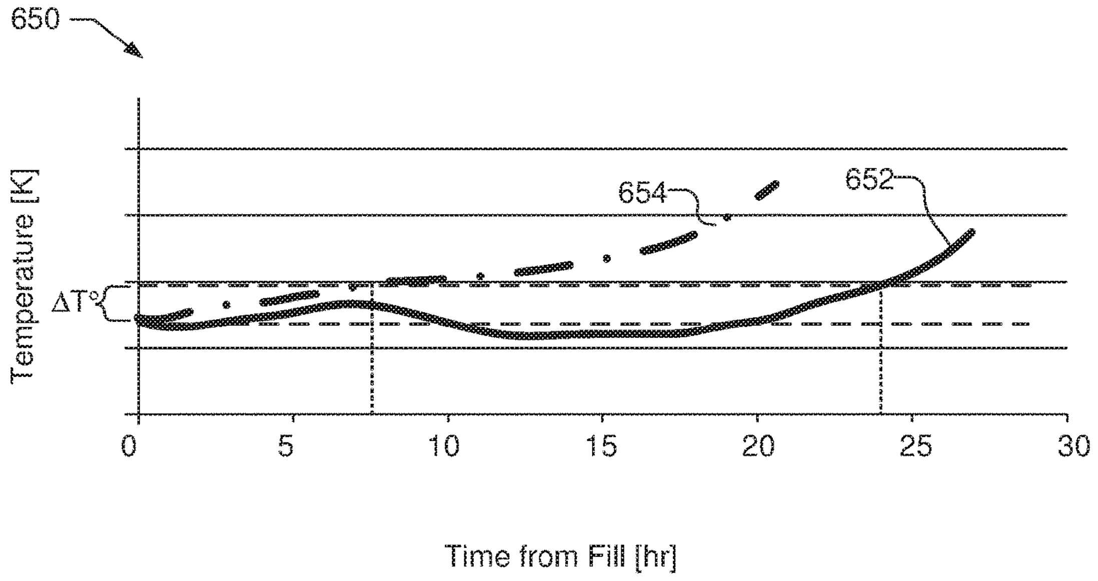
FIG. 6B is a graph illustrating the hold time of a Dewar flasks with different configurations.

FIG. 6B is a graph 650 illustrating a simulation of the temperature stability of a Dewar flask that includes a thermal transfer member having fins, such as fins 536 shown in FIG. 5, compared to a Dewar flask that includes a thermal transfer member without fins, such as illustrated in FIG. 4. Graph 650 shows the time from fill along the x axis and temperature on the y axis. Curve 652 represents temperature over time from fill for a Dewar flask that includes fins and curve 654 represents temperature over time from fill for a Dewar flask that does not include fins. As can be seen, a Dewar flask with fins (curve 652) has improved temperature stability of the detector over time, e.g., an ΔT° K temperature increase takes over 15 hours more for a Dewar flask with fins (curve 652) than a Dewar flask without fins (curve 654). Temperature stability of the detector directly affects detector signal intensity and therefore measurement stability and measurement repeatability.

Figure 7:
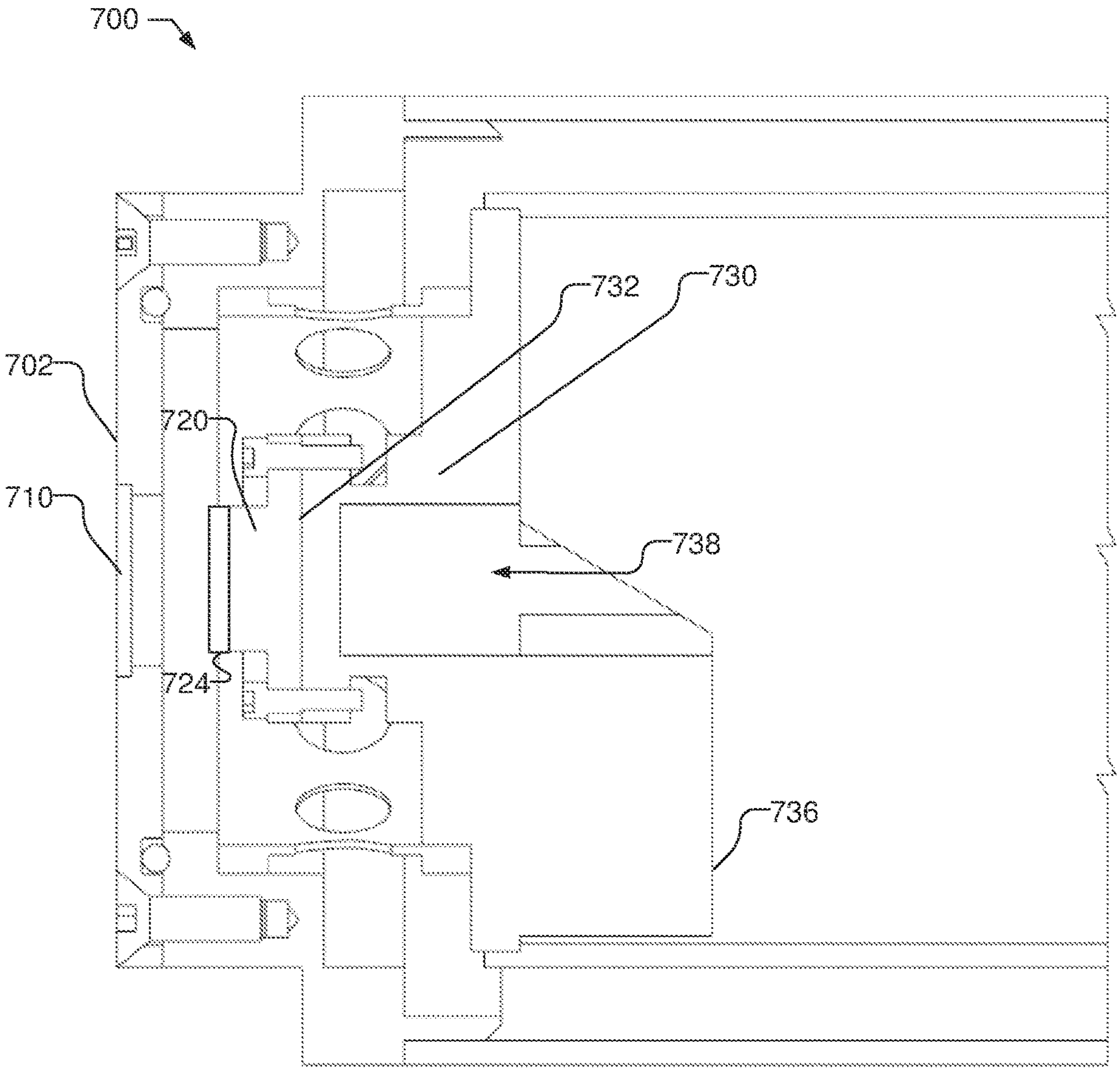
FIG. 7 illustrates a cut-away perspective view of an end portion of a horizontal Dewar flask with a thermal transfer member that includes a plurality of fins and a cavity to bias thermal transfer from the sensor to the bottom portion of the thermal transfer member.

FIG. 7 illustrates a cut-away side view of the end portion of a horizontal Dewar flask 700, which may be similar to the horizontal Dewar flask 500 shown in FIG. 5. Dewar flask 700 illustrates the window mount 702 with window 710 and sensor mount 720 with sensor 724. Similar to the thermal transfer member 530 shown in FIG. 5, the thermal transfer member 730 of Dewar flask 700 includes at least one projection 736, in the form of a fin. In addition, thermal transfer member 730 includes a counter bore to produce a cavity 738 to reduce thermal resistance. Due to the presence of the cavity 738, the thermal transfer member 730 has less material between the first surface 732, upon which the sensor mount 720 is mounted, and liquefied gas present in the cavity 738 thereby reducing thermal resistance, which may assist in compensating for the loss of thermal transfer as the liquefied gas evaporates.

Figure 8:
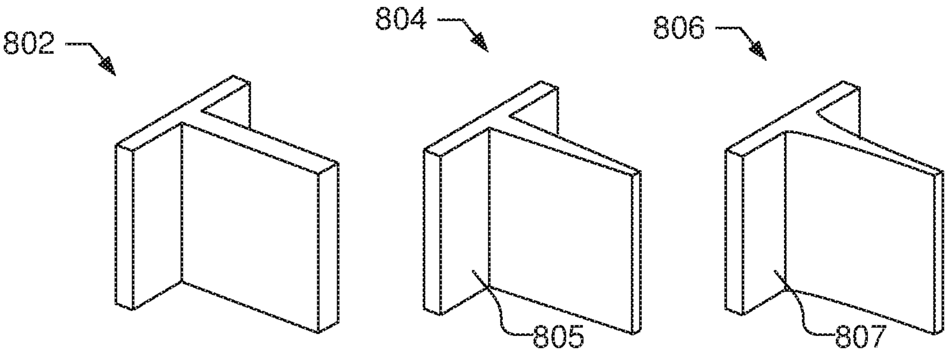
FIGS. 8, 9, and 10 illustrate different types of projection that may be present on a thermal transfer member to bias thermal transfer from the sensor to the bottom portion of the thermal transfer member.
Figure 9:
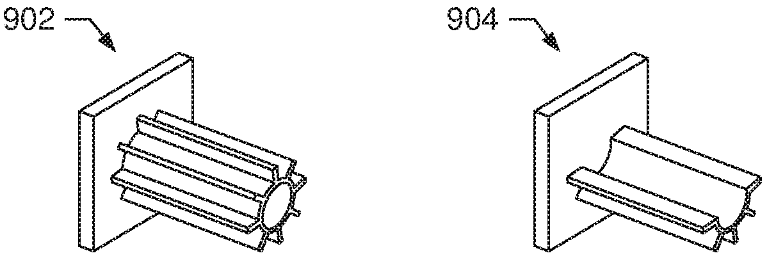
Figure 10:
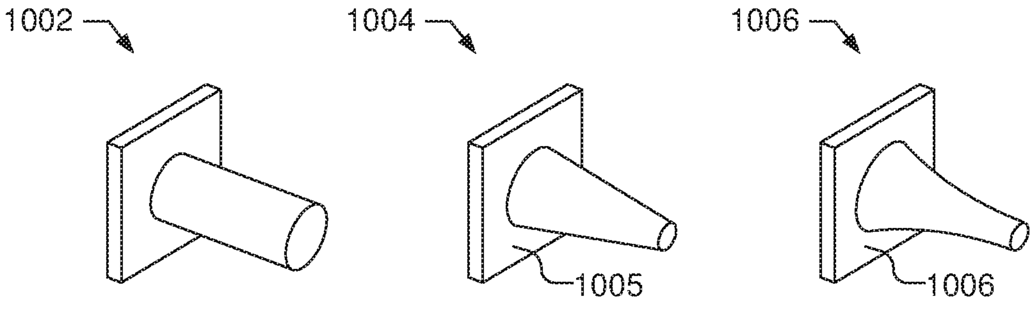

It should be understood that the thermal transfer member may include other mechanisms to help compensate for the effects of the heat transfer transition as the liquefied gas evaporates. For example, the thermal transfer member may include different types of projection, such as ridges, corrugations, pins, and cones. FIGS. 8, 9, and 10 illustrate different types of projection that may be present on a thermal transfer member. FIG. 8, by way of example, illustrates three types of fins that may be used, where fin 802 has a square cross section, fin 804 has a linearly tapered cross section, e.g., the thickness of fin 804 decreases linearly based on the distance from the base 805 of the fin 804, and fin 806 has a non-linearly tapered cross section, e.g., the thickness of fin 806 decreases in non-linear manner based on the distance from the base 807 of the fin 806. As with fins 536 or 736 shown in FIGS. 5 and 7, respectively, the fins shown in FIG. 8 may be located only at the bottom portion of the thermal transfer member. Moreover, the top portion of the fins may be tapered, as shown in FIG. 5 or may include a counter bore as shown in FIG. 7. Alternatively, a plurality of fins may be used with a high density at a bottom portion of the thermal transfer member and a low density, e.g., zero, at the upper portion of the thermal transfer member.

FIG. 9 illustrates a cylindrical projection 902 and a partially cylindrical projection 904, both of which have radial fins, that may be used with a thermal transfer member instead of fins. As illustrated, a cylindrical projection 902 may include a cavity, which may function similar to cavity 738 shown in FIG. 7. If desired, a single large projection, e.g., cylindrical projection 902 or partially cylindrical projection 904, may be used or a plurality of smaller projections may be used. If multiple projections are used, the density of the projections may vary, e.g., with a high density at a bottom portion of the thermal transfer member and a low density, e.g., zero, at the upper portion of the thermal transfer member. The partial cylindrical projection 904 includes a bottom portion of the projection and no top portion so that the projection 904 is not present at the upper portion of the thermal transfer member.

FIG. 10 illustrates three cylindrical projections, e.g., pins or cones, without radial fins that may be used with thermal transfer member instead of fins. Pin 1002 may have a constant thickness, while pin 1004 may have a linearly tapered thickness, e.g., the thickness of pin 1004 decreases linearly based on the distance from the base 1005 to form a cone, and pin 1006 has a non-linearly tapered thickness, e.g., the thickness of pin 1006 decreases in a non-linear manner based on the distance from the base 1007 to form a cone. If desired, a single large pin may be used or a plurality of smaller pins may be used, e.g., where the density of the pins may vary, e.g., with a high density at a bottom portion of the thermal transfer member and a low density, e.g., zero, at the upper portion of the thermal transfer member.

Figure 11:
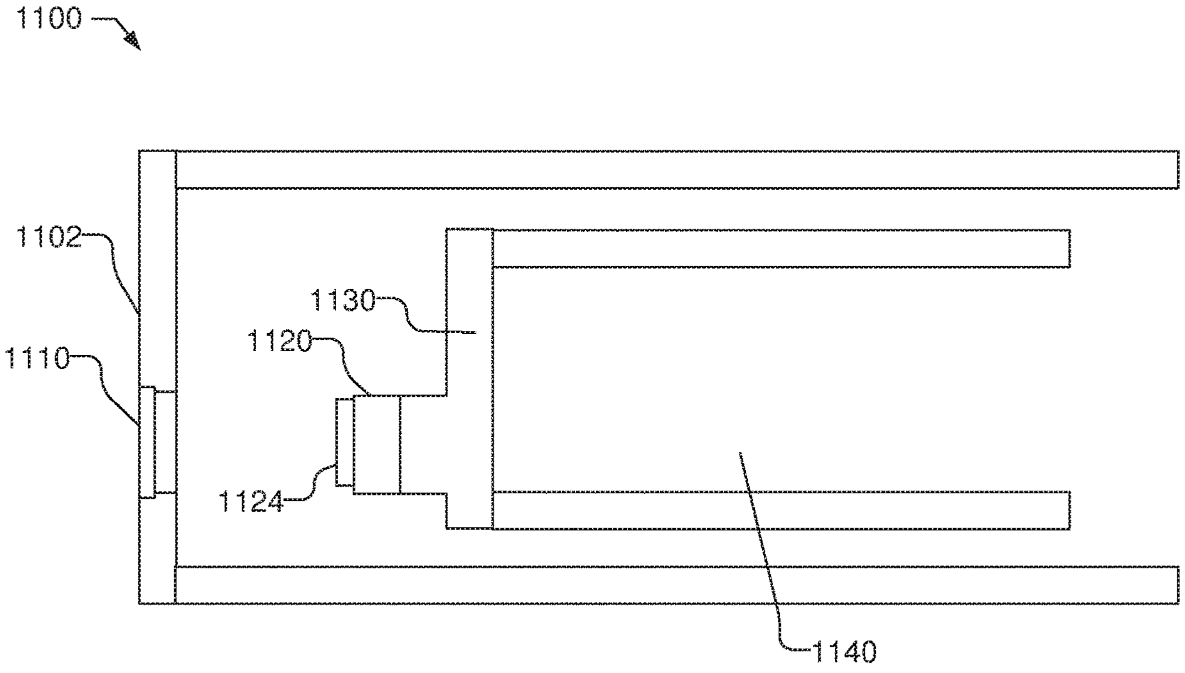
FIG. 11 is a side view of an end portion of a horizontal Dewar flask with a thermal transfer member that biases thermal transfer from the sensor to the bottom portion of the thermal transfer member.

It should be understood that a combination of different projections may be used together with the thermal transfer member. Moreover, other mechanisms may be used to help compensate for the effects of the heat transfer transition as the liquefied gas evaporates. For example, as illustrated in the side view of a Dewar flask 1100 show in FIG. 11, the thermal transfer member 1130 may be configured so that the sensor 1124 on the sensor assembly 1120 is biased to the bottom of the internal chamber 1140, which may assist in compensating for the effects of the heat transfer transition as the liquefied gas evaporates. The window 1110 may be offset in the window mount 1102 in order to be aligned with the sensor 1124 in this configuration. Any of the projections discussed herein may be used with the thermal transfer member 1130. Moreover, a counter bore, which produces a cavity, similar to that shown in FIG. 7 may be used with the Dewar flask 1100, which may assist in compensating for the effects of the heat transfer transition as the liquefied gas evaporates.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. An apparatus for transferring heat from a liquefied gas cooled detector, comprising:

a horizontal Dewar flask positioned with a length extending in a horizontal direction, the horizontal Dewar flask having an internal chamber for holding liquefied gas, the internal chamber having a first end and a second end and having a top and a bottom; and a thermal transfer member mounted to the first end of the horizontal Dewar flask, the thermal transfer member having a thermal transfer surface and a second surface that is opposite the thermal transfer surface and that is in direct physical contact with the liquefied gas held in the internal chamber, the second surface has at least one projection that extends in the horizontal direction into the internal chamber of the horizontal Dewar flask and provides a larger surface area in direct physical contact with the liquefied gas at the bottom of the internal chamber than at the top of the internal chamber;

wherein the thermal transfer surface of the thermal transfer member is configured to have the liquefied gas cooled detector mounted thereon.

2. The apparatus of claim 1, wherein the at least one projection comprises a plurality of projections that extend into the internal chamber of the horizontal Dewar flask at the bottom of the internal chamber.

3. The apparatus of claim 2, wherein the plurality of projections comprise a plurality of vertically oriented fins, that are located at a bottom portion of the second surface of the thermal transfer member and not at a top portion of the second surface of the thermal transfer member.

4. The apparatus of claim 3, wherein the vertically oriented fins have top surfaces that are tapered.

5. The apparatus of claim 2, wherein the plurality of projections comprises at least one of ridges, corrugations, pins, and cones.

6. The apparatus of claim 1, wherein the at least one projection comprises at least one of a cylindrical projection having fins that extend radially from the cylindrical projection, a partially cylindrical projection having fins that extend radially from the partially cylindrical projection, or a cylindrical projection without fins.

7. The apparatus of claim 1, wherein the thermal transfer member further comprises a cavity extending at least partially through the thermal transfer member and opening to the internal chamber.

8. The apparatus of claim 1, further comprising a sensor assembly including the liquefied gas cooled detector mounted on the thermal transfer surface of the thermal transfer member, wherein the liquefied gas cooled detector is an infrared radiation detector.

9. An apparatus for transferring heat in a liquefied gas cooled detector, comprising:

a horizontal Dewar flask positioned with a length extending in a horizontal direction, the horizontal Dewar flask having an internal chamber for holding liquefied gas, the internal chamber having a first end and a second end and having a top and a bottom; and a thermal transfer member mounted to the first end of the horizontal Dewar flask, the thermal transfer member having a first surface and a second surface that is opposite the first surface and that is in direct physical contact with the liquefied gas held in the internal chamber, the second surface having a larger surface area at a bottom portion of the second surface than at an upper portion of the second surface, wherein the second surface of the thermal transfer member has at least one projection that extends in the horizontal direction into the internal chamber and at the bottom of the internal chamber and produces the larger surface area in direct physical contact with the liquefied gas at the bottom portion of the second surface than at the upper portion of the second surface, wherein the liquefied gas cooled detector is thermally coupled to the first surface.

10. The apparatus of claim 9, further comprising a window mounted at the first end of the horizontal Dewar flask and facing the first surface, the window configured to pass radiation to be received by the liquefied gas cooled detector thermally coupled to the first surface.

11. The apparatus of claim 9, wherein the at least one projection comprises a plurality of projections that extend into the internal chamber at the bottom of the internal chamber, the plurality of projections comprise at least one of a plurality of vertically oriented fins, ridges, corrugations, pins, or cones.

12. The apparatus of claim 11, wherein the plurality of projections are located at the bottom portion of the second surface of the thermal transfer member and not at the upper portion of the second surface of the thermal transfer member.

13. The apparatus of claim 11, wherein the plurality of projections have a first density at the bottom portion of the second surface and a second density at the upper portion of the second surface, the first density being greater than the second density to produce the larger surface area at the bottom portion of the second surface than at the upper portion of the second surface.

14. The apparatus of claim 9, wherein the at least one projection comprises at least one of a cylindrical projection having fins that extend radially from the cylindrical projection, a partially cylindrical projection having fins that extend radially from the partially cylindrical projection, or a cylindrical projection without fins.

15. The apparatus of claim 9, wherein the liquefied gas cooled detector is thermally coupled to the first surface at a bottom portion of the first surface.

16. An apparatus for transferring heat in a liquefied gas cooled detector, comprising:

a horizontal Dewar flask positioned with a length extending in a horizontal direction, the horizontal Dewar flask having an internal chamber for holding liquefied gas, the internal chamber having a first end and a second end and having a top and a bottom;

a thermal transfer member mounted to the first end of the horizontal Dewar flask, the thermal transfer member having a first surface and a second surface that is opposite the first surface and that is in direct physical contact with the liquefied gas held in the internal chamber, the second surface having a means for biasing thermal transfer to liquified gas at the bottom of the internal chamber extending in the horizontal direction into the internal chamber and providing a larger surface area in direct physical contact with the liquefied gas at the bottom of the internal chamber than at the top of the internal chamber; and a means for thermal transfer from the liquefied gas cooled detector to the thermal transfer member.

17. The apparatus of claim 16, wherein the means for biasing thermal transfer of heat comprises one or more projections that extend into the internal chamber and have a larger surface area at a bottom portion of the second surface than at an upper portion of the second surface.

18. The apparatus of claim 17, wherein the one or more projections comprise a plurality of projections that extend farther into the internal chamber at the bottom portion of the second surface of the thermal transfer member than at a top portion of the second surface of the thermal transfer member.

19. The apparatus of claim 17, wherein the one or more projections comprises plurality of projections have a first density at the bottom portion of the second surface and a second density at the upper portion of the second surface, the first density being greater than the second density.

* * * * *